United States Patent Office 3,331,849
Patented July 18, 1967

3,331,849
INDOLOMORPHINANS AND PROCESS FOR THEIR PRODUCTION
John Shavel, Jr., Mendham, and Glenn C. Morrison, Dover, N.J., assignors to Warner-Lambert Pharmaceutical Company, Morris Plains, N.J., a corporation of Delaware
No Drawing. Filed Sept. 11, 1963, Ser. No. 308,076
9 Claims. (260—286)

This invention relates to new and useful heterocyclic compounds and relates more particularly to new and novel indolomorphinians having the formula:

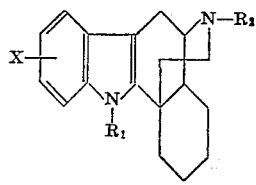

wherein $R_1$ may be hydrogen, or lower alkyl such as methyl, ethyl, or propyl; cycloalkylmethyl such as cyclopropylmethyl, $R_2$ may be hydrogen; lower alkyl such as methyl, ethyl or propyl; cycloalkylmethyl such as cyclopropylmethyl; alkenyl such as vinyl, dimethylallyl or allyl; aryl such as phenyl or chlorophenyl; aralkyl such as phenethyl or benzyl; substituted aralkyl such as methoxybenzyl or a heterocyclic radical such as pyridlylethyl or morpholino and X may be hydrogen, lower alkyl such as methyl, ethyl or propyl, halogen such as chlorine, fluorine or bromine, lower alkoxy such as methoxy or ethoxy, nitro or mercapto.

The symbols $R_1$, $R_2$ and X as used hereinafter have the same meaning as defined.

This invention also includes within its scope a new and novel process for preparing the above compounds as well as the intermediates obtained during the synthesis.

The new and novel compounds of this invention have interesting and significant pharmacological activity and are useful as analgesics, anti-tussive and anti-inflammatory agents. In addition, they are valuable intermediates in the production of other compounds of the indolomorphinian series.

It has now been found that the compounds of this inveniton may be prepared by the following reaction sequence.

First, cyclohexenylethylamine of the formula:

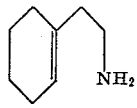

is treated with either indoleacetic acid or a substituted indoleacetic acid of the formula:

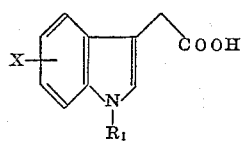

or with an ester of said acids, such as methyl indoleacetate, to form an amide of the formula:

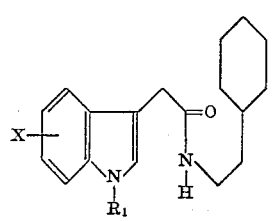

This reaction is normally carried out at a temperature of about 175° to 180° C. for about 10 hours blanketed under a stream of nitrogen.

Second, the above amide I is then treated with phosphorous oxychloride at ambient temperature such as 20° to 30° C. to ring-close the amide and to form an isoquinoline compound having a nucleus of the following structural formula:

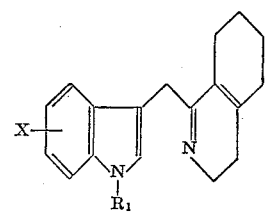

The third step in this reaction sequence involves treatment of the Compound II with a reducing agent such as sodium borohydride to form a compound of the formula:

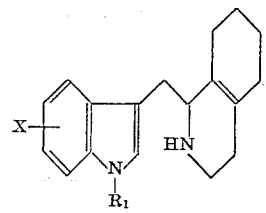

Compound IV is then treated with a formate of the formula HCOOR$_2$ such as ethyl formate under reflux followed by reduction with lithium aluminum hydride to yield Compound V wherein $R_2$ is methyl.

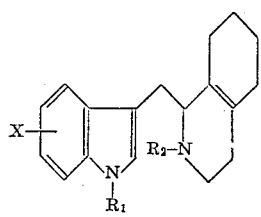

An alternate pathway to obtain Compound V is to treat Compound II with a compound of the formula $R_2Y$ in which Y may be a halide radical such as iodide or bromide or a tosylate radical that is p-toluene sulfonate and $R_2$ is as defined to obtain a quaternary salt of the formula:

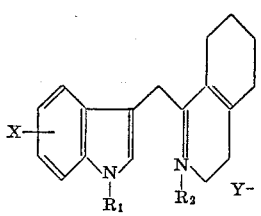

This compound is normally not isolated but reduced directly with sodium borohydride to form Compound V. Among the compounds which may be employed to form the quaternary salts are, for example, methyl iodide, ethyl bromide, methyl tosylate, cyclopropylmethyl tosylate and the like.

The next step is the ring closure reaction of Compound

V to form the desired indolomorphinan nucleus of the formula:

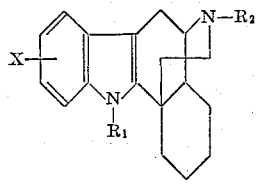

This ring closure reaction may be effected by treating Compound V with phosphoric acid under nitrogen employing a reaction temperature of about 150° C. In addition, when $R_2$ is hydrogen Compound IV may also be obtained by ring closing.

Finally, Compound VI, when $R_1$ is hydrogen, may be methylated by reaction with a methylating agent such as dimethyl carbonate in the presence of sodium hydride to form a 6-methyl substituted indolomorphinan of the formula:

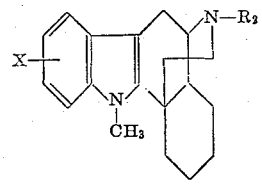

The foregoing reaction steps may be conveniently illustrated by the following schematic diagram:

The compounds of our invention may be converted into their pharmaceutically acceptable nontoxic acid addition and quaternary ammonium salts by conventional procedures. Exemplary of nontoxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate.

For therapeutic use, our compounds, either as the free base or in the form of salts, may be combined with conventional pharmaceutical diluents and carriers to form such dosage units as tablets, capsules, suppositories, elixirs, solutions or suspensions.

The following examples are included in order further to illustrate the present invention. All temperatures are given in degrees centigrade.

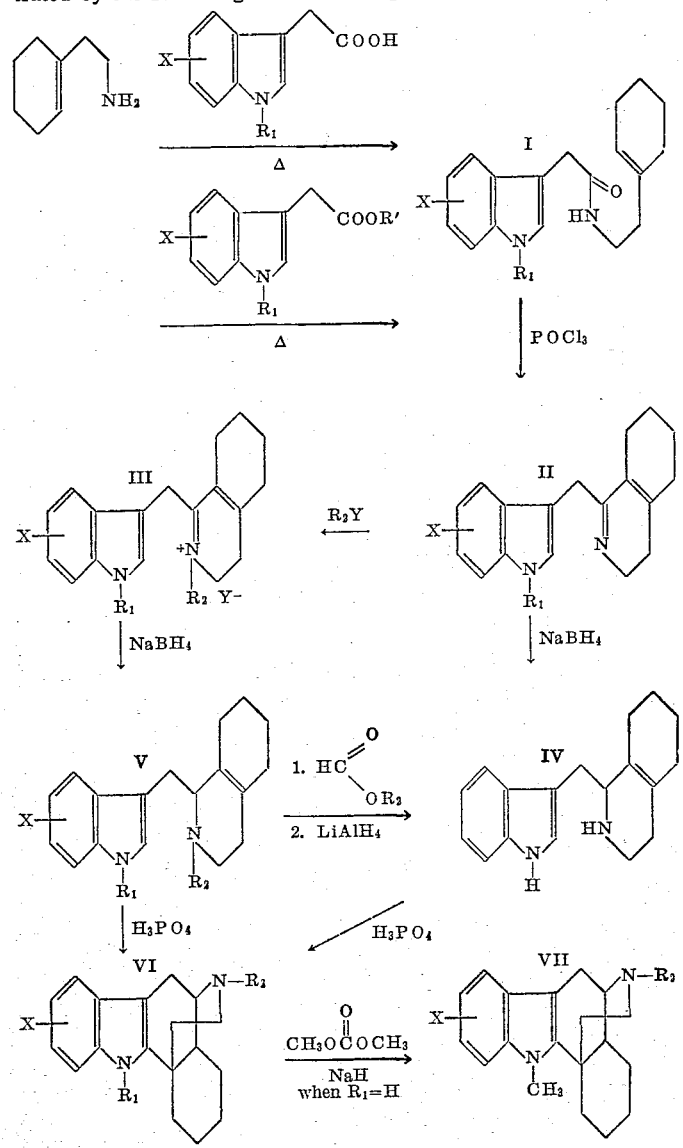

EXAMPLE 1.—N[2-(1-CYCLOHEXENYL)ETHYL]-3-ACETAMIDE (I)

A. From indoleacetic acid

A mixture of 175 g. of 3-indoleacetic acid and 138 g. of cyclohexenylethyl amine is heated at 175° for ten hours under a stream of nitrogen. The reaction mixture is dissolved in benzene, washed in sequence with dilute hydrochloric acid, saturated sodium bicarbonate solution and water, dried over sodium sulfate and diluted with Skelly B (essentially n-hexane). On standing there is deposited 205 g. (73%) of N[2-(1-cyclohexenyl)ethyl]-3-acetamide as a crystalline solid, M.P. 87.5°–88.5°. Further recrystallization from benzene and Skelly B gives an analytical sample, M.P. 87.5°–88.5°, $\nu_{max.}^{Nujol}$: 1525, 1678, 3340 cm.$^{-1}$, $\nu_{max.}^{CHCl_3}$: 740, 1527, 1640, 3200 cm.$^{-1}$, $\lambda_{max.}^{EtOH}$: 220 m$\mu$ (32,800), 272 (5,600), 280 (6,000), 289 (5,200)

Analysis for $C_{18}H_{22}N_2O$—Calc.: C, 76.56; H, 7.85; N, 9.92. Found: C, 76.51; H, 7.90; N, 9.89.

B. From methyl indoleacetate

A mixture of 5.0 g. of methyl indoleacetate and 3.25 g. of N-methylcyclohexenylethyl amine is heated at 100° for 48 hours in a flask equipped with an ascarite drying tube. Treatment of the reaction mixture as above gives 2.5 g. (34%) of a crystalline solid, M.P. 87°–88°. This sample is shown to be identical with that obtained in method A by a mixed melting point determination and by infrared analysis.

EXAMPLE 2.—3,4,5,6,7,8-HEXAHYDRO-1-(INDOL-3-YLMETHYL)-2-METHYL-ISOQUINOLINE (II)

To 100 ml. of phosphorous oxychloride in a round bottom flask equipped with drying tube is added 28.2 g. of N-[2-(1-cyclohexenyl)ethyl]3-acetamide. The mixture is swirled occasionally until solution is complete, with the evolution of heat. The solution is allowed to stand at 20°–30° for 16 hours, and then poured into one liter of ether. The precipitate is rubbed up to a gummy consistency and the supernatant decanted. The gum is washed with an additional 500 ml. of ether. One liter of water is added and the mixture heated at 45° for 30 minutes with occasional stirring. The resulting solution is cooled, filtered, basified with 25% sodium hydroxide solution, and extracted with ether. The ethereal solution is washed with water, and dried over sodium sulfate. Removal of the solvent at 45° in vacuo gives 23.0 g. of 3,4,5,6,7,8-hexahydro-1-(indol-3-ylmethyl)-2-methyl-isoquinoline in the form of a gum.

*Picrate salt.*—An acidic aqueous solution of the base (from 2.82 g. of amide) prepared as above is treated with aqueous picric acid giving 3.60 g. (73%) of a yellow red crystalline solid, M.P. 154°–155.5°. Further recrystallization from ethanol gives an analytical sample, M.P. 155.5°–157° dec., $\nu_{max.}^{Nujol}$: 740, 1560, 1592, 1630, 1675, 3320 cm$^{-1}$, $\lambda_{max.}^{EtOH}$: 217 m$\mu$ (48,000), 250 (shoulder 12,500) 280 (11,500), 287 (11,000), 357 (16,000), 400 (shoulder 11,000)

Analysis for $C_{24}H_{23}N_8O_7$—Calc.: C, 58.42; H, 4.70; N, 14.19. Found: C, 58.56; H, 4.89; N, 13.91.

EXAMPLE 3.—1,2,3,4,5,6,7,8-OCTAHYDRO-1-(INDOL-3-YLMETHYL)-ISOQUINOLINE (IV)

To a solution of crude 3,4,5,6,7,8-hexahydro-1-(indol-3-ylmethyl)-isoquinoline (prepared from 7.0 g. of amide as above) in 65 ml. of methanol is added 8.1 g. of potassium borohydride in four portions over a 90 minute interval. Stirring is continued for 48 hours. The insolubles are removed by filtration, and the solution concentrated to dryness in vacuo. The residue is treated with 100 ml. of a 2.5% sodium hydroxide solution and extracted with methylene chloride. The methylene chloride solution is dried over sodium sulfate. Removal of the solvent gives 3.6 g. of a solid which is chromatographed on alumina. Elution with 5% methanol in ether gives 1.23 g. (18%) of 1,2,3,4,5,6,7,8-octahydro-1-(indol-3-ylmethyl)-isoquinoline as a solid. Recrystallization from Skelly B gives an analytical sample, M.P. 157°–158°, $\nu_{max.}^{Nujol}$: 738, 3120 cm.$^{-1}$, $\lambda_{max.}^{EtOH}$: 222 m$\mu$ (38,000), 273 (5,800), 282 (6,100), 290 (5,250)

Analysis for $C_{18}H_{22}N_2$—Calc.: C, 81.16; H, 8.33; N, 10.52. Found: C, 81.20; H, 8.51; N, 10.64.

EXAMPLE 4.—1,2,3,4,5,6,7,8-OCTAHYDRO-1-(INDOL-3-YLMETHYL)-2-METHYL-ISOQUINOLINE (V)

A. From 3,4,5,6,7,8-hexahydro-1-(indol-3-ylmethyl)-isoquinoline

In a flask equipped with a drying tube, a solution of 40 g. of methyl iodide in 150 ml. of acetone, cooled to 0° is added to 3,4,5,6,7,8-hexahydro-1-(indol-3-ylmethyl)-isoquinoline (prepared from 28.2 g. of amide as above) in 40 ml. of acetone and cooled to 0°. The solution is allowed to stand at a temperature of 20°–30° for 16 hours. Removal of the solvent at 15° in vacuo gives a gum which is dissolved in 250 ml. of ethanol. In vacuo on the steam bath 50 ml. of ethanol is removed. The volume is adjusted to one liter and 25 g. of sodium borohydride added at 25°–30° during a 90 minute interval. Stirring is continued for two hours. The solvent is removed in vacuo on the steam bath. The residue is treated with 1250 ml. of 2.5% sodium hydroxide solution and extracted with ether. The ethereal solution is washed with water and dried over sodium sulfate. Removal of the solvent gives 14.0 g. of a solid which is chromatographed on alumina. Elution with ether gives 8.6 g. of 1,2,3,4,5,6,7,8-octahydro-1-(indol-3-ylmethyl)-2-methyl-isoquinoline as a solid which on recrystallization from Skelly B gives 7.0 g. (22%) of a crystalline solid, M.P. 147.5°–148.5°. Further recrystallization from Skelly B gives an analytical sample, M.P. 146.5°–147.5°, $\nu_{max.}^{Nujol}$: 738, 3140 cm.$^{-1}$, $\nu_{max.}^{CHCl_3}$: 3450 cm.$^{-1}$, $\lambda_{max.}^{EtOH}$: 222 m$\mu$ (35,800) 272 (5,100), 281 (5,720) 290 (5,000)

Analysis for $C_{19}H_{24}N_2$—Calc.: C, 81.38; H, 8.63; N, 9.99. Found: C, 81.40; H, 8.81; N, 9.83.

B. From 1,2,3,4,5,6,7,8-octahydro-1-(indol-3-ylmethyl)isoquinoline

A solution of 90 ml. of 1,2,3,4,5,6,7,8-octahydro-1-(indol-3-ylmethyl)-isoquinoline in 10 ml. of ethyl formate is refluxed for 16 to 20 hours. The excess ester is removed in vacuo. The residue is dissolved in 50 ml. of ether, and 1.0 g. of lithium aluminum hydride is added. After stirring for 18 hours, the excess hydride is decomposed by cautious addition of water. A 50% sodium hydroxide solution is added dropwise until the precipitate coagulates and the ether decanted. Removal of the solvent gives 50 mg. of a solid which on recrystallization from Skelly B gives 19 mg. (19%) of 1,2,3,4,5,6,7,8-octahydro-1-(indol-3-ylmethyl)-2-methyl-isoquinoline as a white crystalline solid, M.P. 148°–149°. This sample is shown to be identical with that obtained in Method A by taking the mixed melting point and by infrared analysis.

EXAMPLE 5.—2-METHYLCYCLOHEX[j]INDOLO[2,3-f]MORPHINAN (VI)

A solution of 14.0 g. of 1,2,3,4,5,6,7,8-octahydro-1-(indol-3-ylmethyl)-2-methyl-isoquinoline in 140 ml. of 85% phosphoric acid is heated at 150° in a nitrogen atmosphere for 16 hours. The reaction mixture is poured into ice water, made basic with 20% sodium hydroxide solution, extracted with methylene chloride, dried over sodium sulfate and the solvent removed. The residue (13.3 g.) is chromatographed on alumina. Elution with dichloromethane gives 7.0 g. of 2-methylcyclohex[j]indolo[2,3-f]

morphinan as a solid having a negative Ehrlich test. Recrystallization from Skelly B gives 4.1 g. (29%) of a white crystalline solid, M.P. 144°–145°, $\nu_{max.}^{Nujol}$: 748, 3200 cm.$^{-1}$, $\nu_{max.}^{CHCl_3}$: 3425 cm.$^{-1}$, $\lambda_{max.}^{EtOH}$: 228 m$\mu$ (35,500), 275 (6,600), 282 (7,200), 290 (6,400).

Analysis for $C_{19}H_{24}N_2$—Calc.: C, 81.38; H, 8.63; N, 9.99. Found: C, 81.12; H, 8.74; N, 9.76.

EXAMPLE 6.—2,6-DIMETHYLCYCLOHEX[j]INDOLO[2,3-f]MORPHINAN HYDROBROMIDE (VII)

A mixture of 2.0 g. of 2-methylcyclohex[j]indolo[2,3-f]morphinan, 2.0 g. of a 55% sodium hydride dispersion in mineral oil, 20 ml. of dimethyl carbonate and 300 ml. of tetrahydrofuran is refluxed for 18 hours. The reaction mixture is poured into one liter of cold water, made acidic with 20% hydrochloric acid and extracted twice with two 250 ml. portions of ether. The ether layers are discarded. The aqueous layer is made basic with 10% sodium hydroxide solution and extracted with two 250 ml. portions of ether. The ether layers are combined, washed with water, dried over sodium sulfate and the solvent removed. The residue is dissolved in ether and acidified with hydrogen bromide. Filtration gives an amorphous solid which on recrystallization from ethylacetate gives 1.77 g. (66%) of 2,6-dimethylcyclohex[j]indolo[2,3-f]morphinan hydrobromide as a crystalline solid, M.P. 222°–225°. Further recrystallization from ethanol gives an analytical sample, M.P. 229°–231°, $\nu_{max.}^{Nujol}$: 758, 2400 cm.$^{-1}$, $\lambda_{max.}^{EtOH}$: 227m$\mu$ (39,200), 277 (shoulder 7,000), 284 (7,500), 292 (shoulder 6,700).

Analysis for $C_{20}H_{27}N_2Br$—Calc.: C, 63.99; H, 7.25; N, 7.46; Br, 21.29. Found: C, 64.06; H, 7.47; N, 7.18; Br, 21.25.

It is understood that the foregoing detailed description is given merely by way of illustration and that many variations may be made therein without departing from the spirit of our invention.

Having described our invention, what we desire to secure by Letters Patent is:

1. A compound selected from the group consisting of those having the formula:

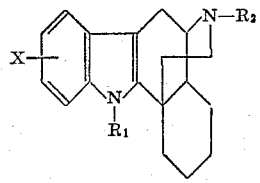

wherein $R_1$ is a member of the group consisting of hydrogen, lower alkyl and cycloalkyl methyl, $R_2$ is a member of the group consisting of hydrogen, lower alkyl, alkenyl, phenyl and phenyl lower alkyl, and X is a member of the group consisting of hydrogen, lower alkyl, halogen, lower alkoxy, and nitro and the nontoxic pharmaceutically acceptable acid addition salts thereof.

2. 2-methylcyclohex[j]indolo[2,3-f]morphinan.

3. 2,6-dimethylcyclohex[j]indolo[2,3-f]morphinan hydrobromide.

4. A compound of the formula:

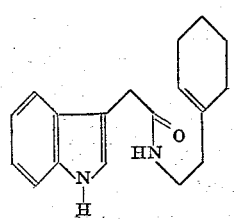

5. A compound of the formula:

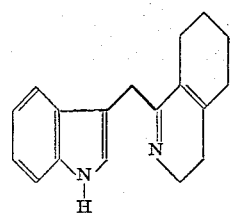

6. A compound of the formula:

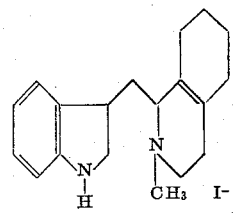

7. A compound of the formula:

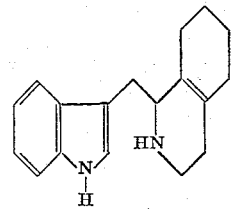

8. A compound of the formula:

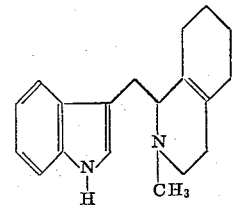

9. A process which comprises contacting a compound of the formula:

with a compound of the formula:

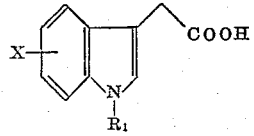

or

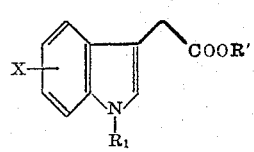

wherein $R_1$ is hydrogen, lower alkyl or cycloalkyl methyl and R' is lower alkyl at a temperature of about 175 to 180° under a stream of nitrogen to obtain an amide of the formula:

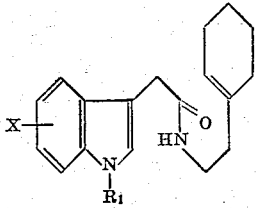

wherein X is a member of the group consisting of hydrogen, lower alkyl, halogen, lower alkoxy and nitro and the nontoxic pharmaceutically acceptable acid addition salts thereof, contacting said amide with phosphorous oxychloride at a temperature of about 20° to 30° C. to form an isoquinoline compound of the formula:

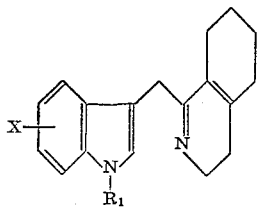

contacting said isoquinoline compound with sodium borohydride to form an intermediate of the formula:

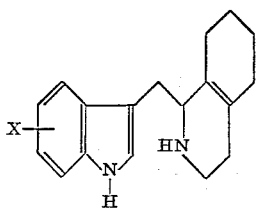

contacting said intermediate with a formate of the formula $HCOOR_2$ wherein $R_2$ is a member of the group consisting of hydrogen, lower alkyl, alkenyl, phenyl or phenyl lower alkyl and contacting the reaction product thus formed with lithium aluminum hydride to yield a compound of the formula:

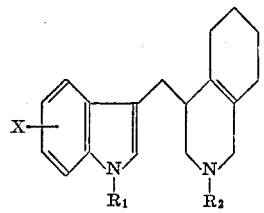

and contacting said compound with phosphoric acid at a temperature of about 150° C.

References Cited
UNITED STATES PATENTS

| | | | |
|---|---|---|---|
| 2,901,483 | 8/1959 | Kuehne | 260—286 |
| 3,149,105 | 9/1964 | Larive et al. | 260—286 |
| 3,153,043 | 11/1964 | Weisbach | 260—288 |

OTHER REFERENCES

Bader: J. Am. Chem. Soc., vol. 81, pages 163–7 (1959).

Gaylord: Reduction with Metal Hydrides, Interscience, 1956, pp. 788–90.

ALEX MAZEL, *Primary Examiner.*

DONALD G. DAUS, *Assistant Examiner.*